United States Patent

Kelly

[15] 3,684,967

[45] Aug. 15, 1972

[54] AUTOMATIC CONTROL OF POSITION AND WIDTH OF A TRACKING WINDOW IN A DATA RECOVERY SYSTEM

[72] Inventor: William J. Kelly, Sauqoit, N.Y.

[73] Assignee: Cogar Corporation, Wappingers Fall, N.Y.

[22] Filed: Jan. 8, 1971

[21] Appl. No.: 104,932

[52] U.S. Cl. ....................328/63, 307/232, 307/234, 307/247 R, 307/269, 307/273, 328/109, 328/140, 328/207, 340/174.1 A

[51] Int. Cl. ................................................H03k 1/18

[58] Field of Search..307/232, 247 R, 265, 269, 273; 328/63, 72, 140, 207; 340/174.1 A, 174.1 B, 174.1 H, 174 ED, 174 CR

[56] References Cited

UNITED STATES PATENTS

| | | | |
|---|---|---|---|
| 3,368,152 | 2/1968 | Jorgensen | 328/140 |
| 3,456,554 | 7/1969 | Goodwin | 307/273 X |
| 3,401,346 | 9/1968 | Brown et al. | 307/269 X |
| 3,423,744 | 1/1969 | Gerlach et al. | 340/174.1 A |
| 3,496,557 | 2/1970 | Lowrance | 340/174.1 A |
| 3,594,738 | 7/1971 | Callens | 340/174.1 A |
| 3,602,828 | 8/1971 | Kurzwell, Jr. et al. | 328/63 X |
| 3,331,079 | 7/1967 | Reader | 340/174.1 H |

*Primary Examiner*—Stanley D. Miller, Jr.
*Attorney*—Gottlieb, Rackman & Reisman and Harry M. Weiss

[57] ABSTRACT

A data recovery tracking window for use in phase modulation systems. Each information data pulse triggers a one-shot delay multivibrator. At the trailing edge of the delay pulse, a second one-shot multivibrator generates a window pulse. The window pulse brackets the next data pulse. By keeping the duty cycle of each of the multivibrator waveforms fixed, the window pulses correctly track the data pulses even with a changing data rate. In the preferred embodiment of the invention, a single error detecting circuit is used to keep both duty cycles constant at pre-set values.

7 Claims, 10 Drawing Figures

INVENTOR
WILLIAM J. KELLY
BY Gottlieb, Rackman & Reisman
Harry M Weiss
ATTORNEYS

AUTOMATIC CONTROL OF POSITION AND WIDTH OF A TRACKING WINDOW IN A DATA RECOVERY SYSTEM

This invention relates to data recovery circuits, and more particularly to data recovery tracking windows.

In magnetic surface recording devices (disc, drum and tape), the Manchester recording technique (also known as "phase modulation") is widely used for high-density recording. The recorded data consists of significant zero crossings which contain the binary information, and non-significant crossings which provide the phase transitions between successive bits of the same sense. In order to recover the significant data, it is necessary to reject the non-significant zero crossings in the data estimation process.

To separate significant zero crossings from non-significant zero crossings, a "time window" is usually generated. This window is synchronized to the significant data rate and "brackets" the significant zero crossings to the exclusion of the non-significant crossings. The window, which is a gating signal used to turn on a gate only when significant zero crossings are anticipated, can be generated in a two-step process. First, each significant zero crossing triggers a time delay circuit. The time delay is slightly shorter than the time period between significant zero crossings. The trailing edge of the time delay pulse triggers a window pulse generator. The width of the window pulse is such that it brackets the time at which the next significant zero crossing is expected.

If the data rate is fixed, time delay and gate window pulse generators having fixed pulse widths can be employed. However, in practice a varying data rate is usually encountered. In a tape drive, for example, the capstan which drives the tape generally reaches its nominal speed very quickly and then rotates at this speed. However, the tape does not move in an identical manner because in effect it is a high-Q spring. A "ringing" effect in the tape speed is observed whenever the tape drive is turned on. It is apparent that if the tape speed varies, so does the data rate. To separate significant and non-significant zero crossings, the time window must follow the data rate in two respects. First, the faster the rate, the earlier that the leading edge of the window must occur following each significant zero crossing. Second, the faster the rate, the shorter the necessary window pulse. Servo loops have been used to control the timing window in this manner, e.g., with the use of phase-locked oscillators with auxiliary timing logic, or controlled delays using radar range techniques (such as split-gate error detection circuits). Since the time window tracks the data rate it is in fact referred to as a "tracking window". In general, the prior art tracking window circuits have been relatively complex, have exhibited relatively narrow tracking ranges, have had relatively slow pull-in characteristics and have been known to falsely lock in on sub-harmonics and harmonics of the nominal signal frequency.

It is a general object of my invention to provide a tracking window circuit which has a broad tracking range (up to several hundred percent and down to 30 percent of the nominal data rate) and a fast pull-in characteristic, does not exhibit false locks and is relatively simple in design.

Briefly, in accordance with the principles of my invention, each significant zero crossing triggers a delay pulse generator. The width of the delay pulse is a predetermined percentage, e.g., 75 percent, of the nominal period between significant zero crossings. At the trailing edge of the delay pulse, a window pulse is generated, the window pulse having a duration which is another fixed percentage, e.g., 50 percent, of the nominal period between significant zero crossings. The window pulse is designed to bracket the next significant zero crossing to the exclusion of an intermediate non-significant zero crossing if such a crossing exists.

If the data rate increases, the widths of both the time delay and window pulses are shortened. Similarly, if the data rate decreases, the widths of both pulses increase. Both pulse widths are controlled such that the leading and trailing edges of the window follow the average data rate and bracket each significant zero crossing. The pulse width variations are controlled by the delay pulse and window pulse waveforms.

The time delay waveform consists of a series of time delay pulses, and the window waveform consists of a series of window pulses. I have discovered that if the duty cycle of each waveform is maintained constant, the time window will automatically track the significant zero crossings.

Each significant zero crossing triggers a one-shot time delay multivibrator. The trailing edge of each time delay pulse triggers a one-shot time window multivibrator. All that is required for the window to track the significant zero crossings is to maintain a fixed duty cycle for each multivibrator. This, in turn, simply requires that the average output of each multivibrator remain constant.

What is equally significant is that the same circuit can be used to keep the duty cycles of the two multivibrators at fixed (different) values. As will be shown below, any change in the average data rate requires the same percentage change in the two duty cycles. Since the same percentage change is required for both, the same error control signal can be used to vary the pulse widths of the two multivibrators.

It is a feature of my invention, in the illustrative embodiment thereof, to provide delay and window controlled one-shot multivibrators in a data recovery tracking window circuit, the duty cycles of both of which are maintained at fixed values.

It is another feature of my invention, in the illustrative embodiment thereof, to derive a single error control signal for adjusting the pulse widths of both multivibrators.

Further objects, features and advantages of my invention will become apparent upon consideration of the following detailed description in conjunction with the drawing, in which:

FIGS. 1 (*a*)–1(*g*) depict the relationship between the recorded information and various signals which are derived in typical data recovery systems;

Figures 1A, 1B, 1C, 1D, 1E, 1F, 1G:
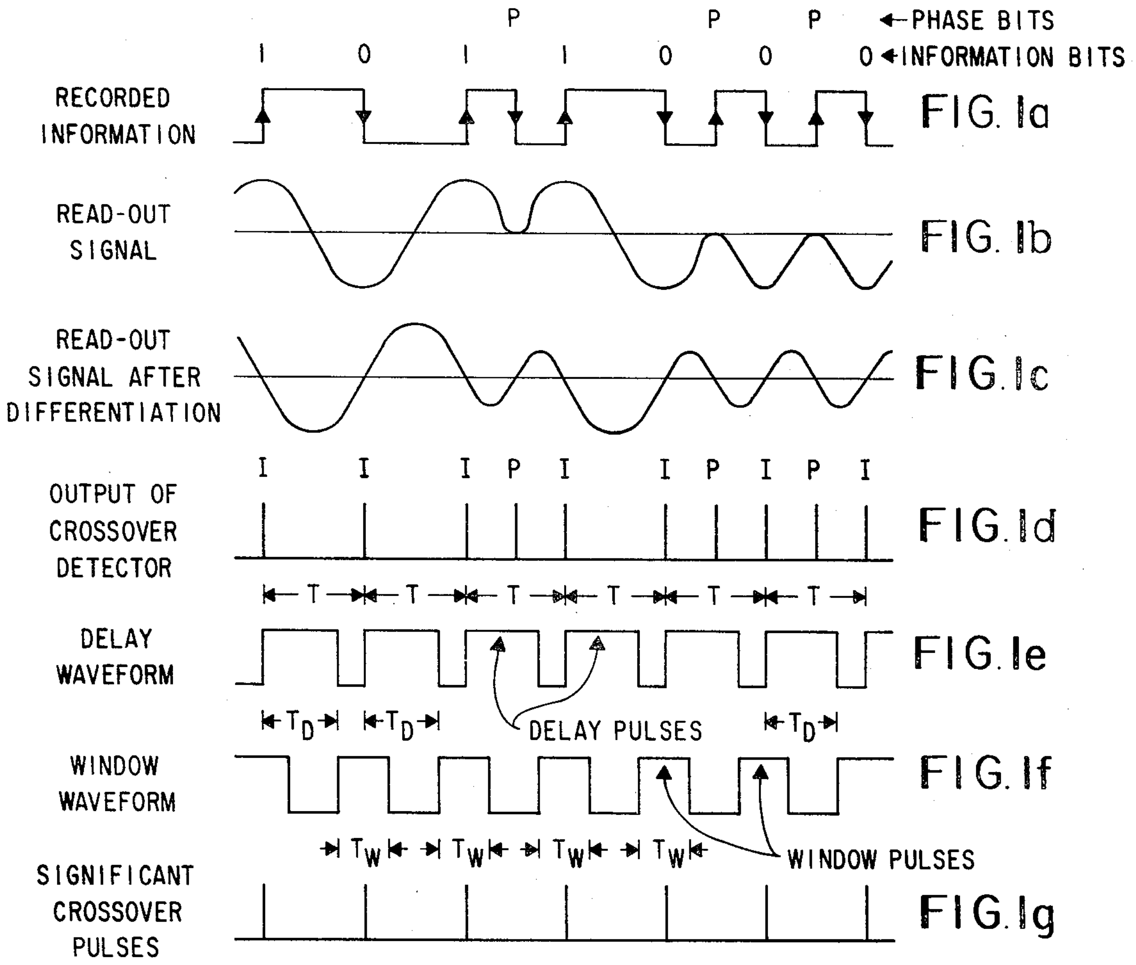

FIG. 1(*a*) depicts the manner in which information is recorded utilizing a phase modulation technique. Information bits are recorded at equally spaced intervals, with a transition in one direction representing a binary 1 and a transition in the other direction representing a binary 0. It is apparent that if two bits of the same value are to be recorded in sequence, it is necessary for an intermediate transition to be made. The transition recorded in such an intermediate region is known as a phase bit, and is designated by the letter P in FIG. 1(*a*). The object of the data recovery circuit is to separate the significant (information) transitions from the non-significant (phase) transitions.

A typical read-out signal for the information depicted in FIG. 1(*a*) is shown in FIG. 1(*b*). The signal contains two basic frequencies: (*a*) a low-frequency signal which represents a digital code of 1010 . . . , and (*b*) a high-frequency signal (of twice the frequency) which represents the digital code 0000 . . . or 1111 . . . . The minima and maxima of the read-out signal occur whenever a magnetic transition moves past a read head.

What is usually done with the read-out signal of FIG. 1(*b*) is that it is differentiated as shown in FIG. 1(*c*). The differentiated signal has a zero crossing corresponding to every minimum and maximum of the read-out signal; the differentiated read-out signal thus has a zero crossing corresponding to every magnetic transition on the recording medium.

Typically, a crossover detector is used to detect the zero crossings in the differentiated read-out signal. As shown in FIG. 1(*d*), the pulses at the output of the crossover detector represent both information and phase bits. In FIG. 1(*d*) the letter I is indicative of an information bit and the letter P is indicative of a phase bit. The drawing also shows that the time period T separates successive information bits.

In order to isolate the information bits from the phase bits two pulse generators can be provided. The first generates a delay pulse of width $T_D$ (FIG. 1(*e*)). The detection of each information bit (significant zero crossing) triggers the delay pulse generator. At the trailing edge of each delay pulse, a window pulse generator is triggered (FIG. 1(*f*)). The window pulse width is designated $T_W$. It is seen in FIG. 1 (*f*) that each window pulse brackets a respective information bit pulse at the output of the crossover detector. In effect, the window pulses enable the system to "look at" only the crossover detector pulses which are bracketed by the window. Consequently, the resulting pulse waveform shown in FIG. 1(*g*) consists of only the "significant" (information) crossover pulses of FIG. 1(*d*).

Although in the above description it has been assumed that the pulses at the output of the crossover detector are always of the same polarity and consequently no distinction is made between the two types (0 and 1) of information bits in the waveform of FIG. 1(*a*), it is understood that each significant crossover pulse (FIG. 1(*g*)) can be used together with the original read-out signal to determine the value of the respective information bit. (The manner in which the delay pulses are initially synchronized to the information bits as opposed to the phase bits, so that they can thereafter cause the system to ignore phase bits and thus allow the delay pulse generator to be triggered only by information bits, will be described below.)

If the data rate is constant then the two time periods $T_D$ and $T_W$ can be fixed. Typically, $T_D$ can be 0.75 of the time interval (T) between information bits, and $T_W$ can be half of this interval. Unfortunately, however, the data rate is rarely constant and this can introduce serious errors. For example, if the delay and window pulse widths remain constant and the time period between information bits increases by slightly more than 25 percent, it will be apparent from FIGS. 1(*d*)–(*f*) that each information bit will fall outside the window. For this reason the time window must be made to track the average data rate.

Figure 2:
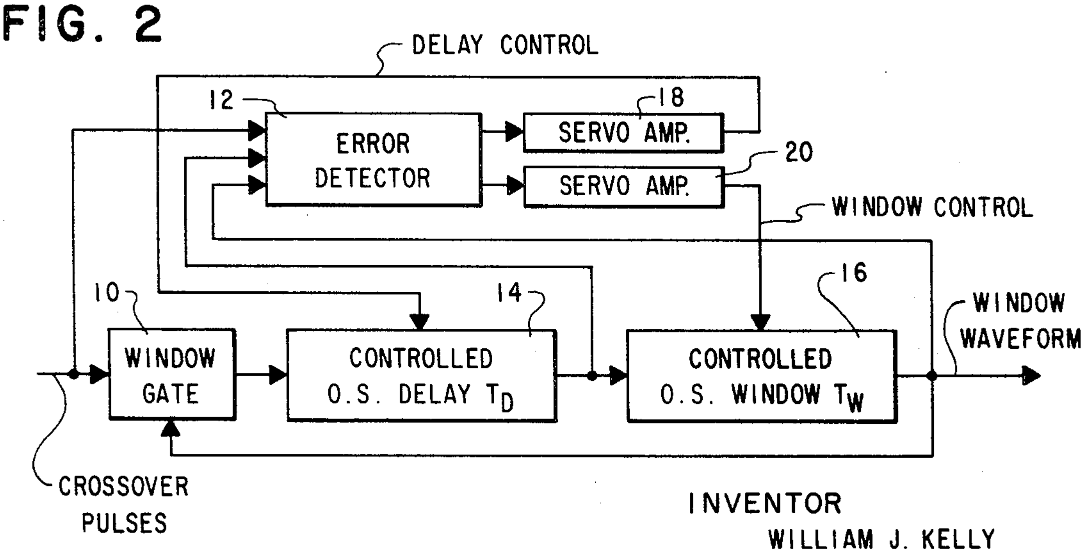
FIG. 2 depicts the principle of a tracking window in accordance with the principles of my invention.

This concept is illustrated in FIG. 2. Each crossover pulse is applied to the input of window gate 10. Assuming that the window waveform at the output of controlled one-shot multivibrator 16 is high when the crossover pulse is received, window gate 10 is enabled and the crossover pulse is transmitted through the gate to one-shot multivibrator 14. This multivibrator is used to generate a delay pulse of duration $T_D$. The output of the multivibrator goes high and is of the form shown in FIG. 1(*e*). Each crossover pulse re-triggers the multivibrator. The trailing edge of each delay pulse triggers one-shot multivibrator 16 to generate a window pulse of width $T_W$, of the form shown in FIG. 1(*f*). The window pulses are used to enable gate 10.

Error detector 12 serves to develop two signals which are fed through respective servo amplifiers 18 and 20 to the control inputs of the two multivibrators. In effect, two feedback loops are provided, each loop controlling the width of the pulses generated by a respective one of the multivibrators. The inputs to error detector 12 are the crossover pulses, the delay waveform and the window waveform (FIGS. 1(*d*)–1(*f* )). The error detector functions to compare the three intervals T, $T_D$ and $T_W$ and to vary the latter two so that each window pulse brackets a significant crossover pulse. The pulse widths of the two multivibrators can be controlled by the error detector by having the servo amplifiers apply appropriate signals to the delay control and window control conductors.

Figure 3:
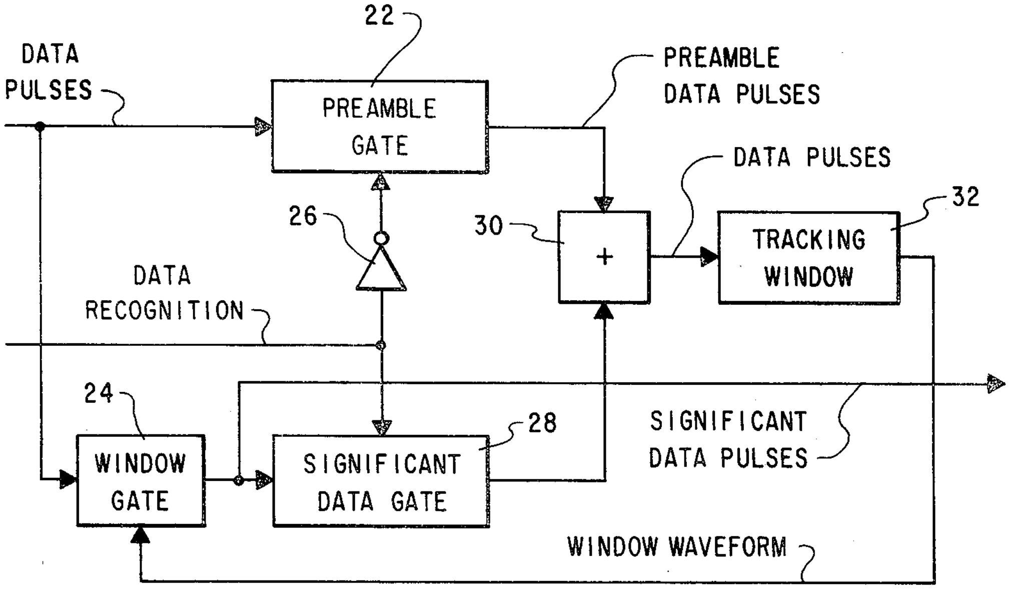
FIG. 3 is a block diagram of a data recovery system utilizing a tracking window.

The present invention is concerned with the manner in which the two multivibrators are controlled. But before the tracking window of the invention is described in detail, it should be understood how such a tracking window is used in a data recovery system. Referring to FIG. 3, data pulses of opposite polarities are applied to the input of preamble gate 22 and the input of window gate 24. The data pulses consist of information bits of both polarities and phase bits of both polarities. When the recording medium first starts to move, it is necessary to synchronize the tracking window 32 to the recorded pulses. Before synchronization, it is difficult to distinguish between information bits and phase bits. For this reason a preamble is usually recorded at the start of each block of information on the record medium. Typically, the preamble can consist of a series of information bits of value 0. In such a case, referring to FIG. 1(*a*), alternate transitions will be detected at a rate of 2/T. The preamble gate is such that it passes only data pulses of the *O* polarity. Consequently, when preamble gate 22 is enabled, preamble data pulses appear at one input of summer 30 at the rate 1/T.

The data recognition conductor is low in potential until logic circuits (not shown) recognize information data (following the preamble). While the data recognition conductor is low, inverter 26 enables preamble gate 22. The preamble data pulses at the output of summer 30 are applied to the input of tracking window circuit 32. The tracking window circuit, which includes delay and window pulse generators, derives a window pulse waveform which is applied to the enable input of window gate 24. The window gate is thus enabled during time intervals which bracket the preamble data pulses. The preamble data pulses appear at the output of the window gate on the "significant data pulse" line. However, as long as significant data gate 28 is disabled, the preamble pulses are not transmitted through this gate to the other input of summer 30.

As soon as information data is recognized, the data recognition line goes high. At this time preamble gate 22 is disabled and significant data gate 28 is enabled. The pulses at the output of window gate 24 are now transmitted through significant data gate 28 to the other input of the summer, and are extended from the output of the summer to the input of tracking window circuit 32. Although information and phase bits of both polarities now appear at the input of window gate 24, the window waveform allows only information bits to be transmitted through the window gate and to appear on the significant data pulse line. In addition, only the information bits are transmitted through gate 28 to the summer input. Information bit pulses of either polarity trigger the delay multivibrator in tracking window circuit 32 and thus the system continues to allow only the information bits to be transmitted through window gate 24. Once the tracking window circuit is synchronized to preamble data bits, it remains synchronized to the information data bits when the data recognition signal goes high. However, this presupposes that the window waveform is continuously varied in accordance with a changing data rate.

Referring to FIGS. 1(*d*)–(*f*), consider the relationship between the three time periods $T$, $T_D$ and $T_W$. Typically, $T_D = 0.75T$ and $T_W = 0.5T$. It follows that $dT_W = 0.5dT$, $dT_D = 0.75\ dT$, and $dT_W/T_W = dT_D/T_D = dT/T$. This latter relationship indicates that if the window pulse, which follows the delay pulse, is to bracket the next significant crossover pulse no matter what the value of $T$, then the percentage change in $T_W$ must equal the percentage change in $T_D$, and both of them must be equal to the percentage change in $T$. In other words, if $T$ increases by 20 percent, then if the delay pulse width and the window pulse width both increase by 20 percent the window pulse will still not only have a duration equal to 0.5 $T$, but it will also bracket the next significant zero crossing.

A satisfactory tracking window circuit can thus be built if the percentage changes in $T_D$ and $T_W$ are made to follow the percentage change in $T$. However, it may be difficult to derive a signal which is dependent upon the percentage change in the data rate. In accordance with the principles of my invention, the necessary change in $T_D$ is effected without even operating upon a signal related directly to the data rate. Referring to FIG. 1(*e*), suppose that the data rate decreases ($T$ increases). If $T_D$ in FIG. 1(*e*) remains the same, it is apparent that the delay waveform will be low for a greater percentage of each complete cycle; the duty cycle of the delay waveform will decrease. If $T_D$ is to remain equal to 75 percent (or any other value) of $T$, then the duty cycle of the delay waveform must be kept constant. If the peak magnitude of the delay waveform is $E$, then the average value of the delay waveform is $(T_D/T)$ $E$. Even if $T$ increases, if the average value of the delay waveform is somehow kept constant, it will necessarily follow that $T_D$ will increase so that the ratio $T_D/T$ (the duty cycle) will remain constant. It is in this manner that the pulse width $T_D$ is automatically varied in accordance with the data rate; by keeping the average value of the delay waveform constant, the ratio $T_D/T$ is kept constant.

In a similar manner, in order to keep the ratio $T_W/T$ constant, all that is required is to keep the average value of the window waveform signal at a fixed level.

Referring back to FIG. 2, it will be apparent that a tracking window circuit can be constructed which consists of window gate 10, one-shot multivibrator 14, one-shot multivibrator 16, and two comparator circuits. The first comparator functions to compare the average value of the delay waveform at the output of multivibrator 14 to a first reference voltage, and to apply any error signal to the control terminal of the multivibrator. In such a manner, the average value of the delay waveform can be kept constant — if the average value falls below the reference voltage, then the error signal serves to increase the pulse width, and vice versa. Similarly, another comparator can be used in a feedback loop associated with one-shot multivibrator 16 to keep its duty cycle equal to the desired value.

In the preferred embodiment of the invention, however, only a single comparator is necessary — the same error signal can be used to control the period of each multivibrator. The pulse width T of a typical voltage-controlled one-shot multivibrator is given by the following equation: $T = k(e_c)^n$, where $n$ is typically +1 or −1 depending on the type of multivibrator utilized and $e_c$ is the control voltage. Taking the derivative of this equation, and then dividing the derivative by the expression for the pulse width, there results: $dT/T = n(de_c/e_c)$. The significance of this result is that the percentage change in the pulse width is seen to be equal to a percentage change in the control voltage. It will be recalled that for the proper operation of the system, $dT_W/T_W = dT_d/T_d = dT/T$. Therefore, the same error signal which controls the proper change in $T_D$ or $T_W$ can be used to control the proper change in the other pulse width.

Figure 4:
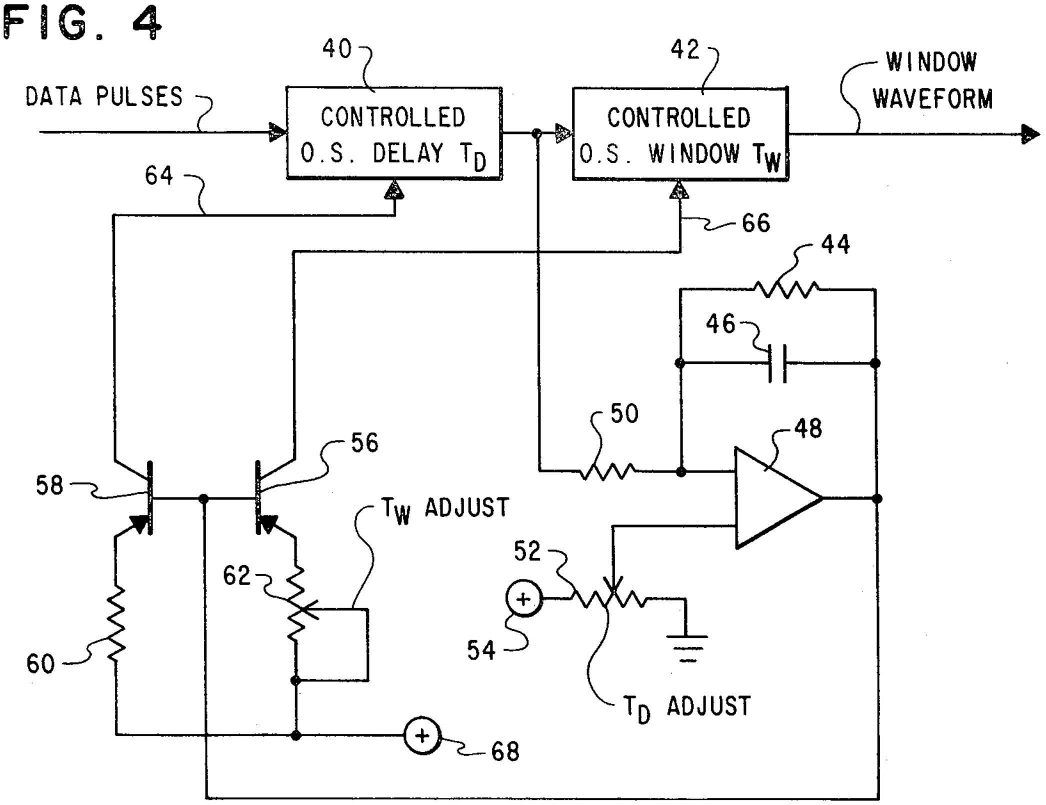
FIG. 4 depicts an illustrative tracking window circuit in which the two multivibrators are controlled by a common error signal.

A circuit for accomplishing this is shown in FIG. 4. Each data pulse applied to the input of multivibrator 40 produces a pulse at the output having a duration $T_D$. At the trailing edge of the pulse, multivibrator 42 is triggered and a window pulse of width $T_W$ is generated. The output of multivibrator 40 is extended through resistor 50 to one input of operational amplifier 48. Capacitor 46 and resistor 44, connected between one input of the operational amplifier and the output, serve to cause the operational amplifier to function as an integrator. The signal at that input of the operational amplifier connected to the feedback loop is proportional to the average value of the delay waveform. The other input of the multivibrator is connected to potentiometer 52, one end of which is grounded and the other end of which is connected to source 54. The output $e_c$ is dependent upon the difference between the two inputs.

The output is extended to the base of transistor 58. The emitter of this transistor is connected through resistor 60 to source 68. As the base voltage varies, the current delivered through transistor 58 to control conductor 64 varies. The feedback is such that the pulse width $T_D$ is continuously adjusted so that the average value of the delay waveform at the output of multivibrator 40 remains equal to the potential at the tap of potentiometer 52. Depending on the setting of the potentiometer (the $T_D$ adjust circuit), the duty cycle of multivibrator 40 remains fixed at the pre-set value, e.g., 75 percent. As described above, this is one of the two control functions which must be accomplished in order for the timing window to track the data rate.

The same error signal $e_c$ is applied to the base of transistor 56. The emitter of this transistor is extended through potentiometer 62 to source 68 and the collector of the transistor is connected over conductor 66 to the control input of multivibrator 42. The setting of potentiometer 62 (the $T_W$ adjust circuit) determines the nominal value of the pulse width of one-shot multivibrator 42 for the nominal data rate. Any change in the data rate results in a change in $e_c$, which in turn varies the current flow through transistor 56. This controls the pulse width of multivibrator 42 so that the duty cycle of the multivibrator also remains constant at the pre-set value (50 percent in the illustrative embodiment of the invention). It is not necessary to provide two separate feedback loops. The same comparator can be used to control two different constant duty cycles.

Although the invention has been described with reference to particular embodiments, it is to be understood that these embodiments are merely illustrative of the application of the principles of the invention. For example, if a wide tracking range is not necessary, it is possible to utilize a window one-shot of fixed pulse width and to control the pulse width of only the delay one-shot to follow the data rate. Thus it is to be understood that numerous modifications may be made in the illustrative embodiment of the invention and other arrangements may be devised without departing from the spirit and scope of the invention.

What I claim is:

1. A data recovery tracking window generating circuit comprising first means for generating at the output thereof a delay pulse responsive to the presence of each of successive data pulses, each delay pulse being shorter than the interval between two successive data pulses, second means responsive to the termination of each delay pulse for generating at the output thereof a window pulse, each window pulse being shorter than the interval between two successive data pulses and the combined durations of each delay pulse and the following window pulse being longer than the interval between two successive data pulses, each of said delay and window pulse generating means including a control terminal the signal at which controls the duration of the respective generated pulse, means for deriving at least one control signal proportional to the average value of the signal at the output of only one of said pulse generating means, and means for coupling said at least one control signal to the control terminals of said delay and window pulse generating means to maintain the average values of the signals at the outputs of said pulse generating means at respective predetermined values.

2. A data recovery tracking window generating circuit in accordance with claim 1 further including gate means for extending said data pulses to said first pulse generating means, means for enabling the operation of said gate means responsive to the presence of a window pulse, and means for blocking data pulses from being transmitted to said first pulse generating means until after successive window pulses are synchronized to said data pulses.

3. A data recovery tracking window generating circuit in accordance with claim 1 wherein each of said first and second pulse generating means is a controlled one-shot multivibrator, and said control signal deriving means includes means for comparing the average value of the signal at the output of one of said first and second pulse generating means to a predetermined value and for developing an error signal proportional to the difference therebetween, and said coupling means couples said error signal to the control terminal of each of said first and second pulse generating means.

4. A data recovery tracking window generating circuit in accordance with claim 3 further including gate means for extending said data pulses to said first pulse generating means, means for enabling the operation of said gate means responsive to the presence of a window pulse, and means for blocking data pulses from being transmitted to said first pulse generating means until after successive window pulses are synchronized to successive data pulses.

5. A data recovery tracking window generating circuit in accordance with claim 4 further including means responsive to a predetermined data pulse sequence for operating said blocking means and for applying said predetermined data pulse sequence directly to said first pulse generating means, and means responsive to the termination of said predetermined data pulse sequence for inhibiting the operation of said applying means and for disabling the operation of said blocking means.

6. A data recovery tracking window generating circuit in accordance with claim 3 wherein said coupling means includes first and second means each connected to a respective one of said control terminals for applying control signals thereto, and means for effecting changes in both of said control signals which are directly proportional to the magnitude of said error signal.

7. A data recovery tracking window generating circuit in accordance with claim 6 further including means for adjusting said predetermined value to determine the duty cycle of said one of said first and second generating means, and adjustable bias means coupled to the control terminal of the other of said first and second generating means for determining the duty cycle of said other generating means.

* * * * *